US011866030B2

(12) United States Patent
Tada et al.

(10) Patent No.: US 11,866,030 B2
(45) Date of Patent: Jan. 9, 2024

(54) CONTROL DEVICE OF HYBRID VEHICLE, HYBRID VEHICLE, AND CONTROL METHOD

(71) Applicant: KAWASAKI MOTORS, LTD., Akashi (JP)

(72) Inventors: Tomoki Tada, Akashi (JP); Shohei Terai, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 47 days.

(21) Appl. No.: 17/456,824

(22) Filed: Nov. 29, 2021

(65) Prior Publication Data

US 2022/0194356 A1 Jun. 23, 2022

(30) Foreign Application Priority Data

Dec. 23, 2020 (JP) ................................ 2020-213173

(51) Int. Cl.
*B60W 20/15* (2016.01)
*B60W 10/06* (2006.01)
*B60W 10/08* (2006.01)

(52) U.S. Cl.
CPC ............ *B60W 20/15* (2016.01); *B60W 10/06* (2013.01); *B60W 10/08* (2013.01); *B60W 2300/36* (2013.01); *B60W 2540/10* (2013.01)

(58) Field of Classification Search
CPC ...... B60W 20/15; B60W 10/06; B60W 10/08; B60W 2300/36; B60W 2540/10
See application file for complete search history.

(56) References Cited

U.S. PATENT DOCUMENTS

2009/0306843 A1   12/2009   Jinno et al.
2010/0138090 A1    6/2010   Jinno et al.
(Continued)

FOREIGN PATENT DOCUMENTS

DE   112007003261 T5   1/2010
DE   102014216983 A1   3/2015
(Continued)

OTHER PUBLICATIONS

Machine Translation of WO2007072797A1 PDF File Name: "WO2007072797A1_Machine_Translation.pdf".*

*Primary Examiner* — Grant Moubry
*Assistant Examiner* — Ruben Picon-Feliciano
(74) *Attorney, Agent, or Firm* — Alleman Hall Creasman & Tuttle LLP

(57) ABSTRACT

A control device of a hybrid vehicle includes: a determiner that determines whether or not a predetermined first condition that efficiency is prioritized is satisfied and whether or not a predetermined second condition that output performance is prioritized; and a control unit that controls an engine and an electric motor in accordance with an accelerator manipulation amount and a determination result of the determiner. When the first condition is satisfied, the control unit controls the driving power source such that the driving power source outputs first driving force in a first driving state where the efficiency is prioritized, and when the second condition is satisfied, the control unit controls the driving power source such that the driving power source outputs second driving force larger than the first driving force in a second driving state where the output performance is prioritized.

14 Claims, 5 Drawing Sheets

(56) References Cited

U.S. PATENT DOCUMENTS

| | | |
|---|---|---|
| 2015/0046009 A1 | 2/2015 | Maruyama et al. |
| 2015/0088349 A1 | 3/2015 | Akashi et al. |
| 2019/0193710 A1 | 6/2019 | Sato et al. |

FOREIGN PATENT DOCUMENTS

| | | | |
|---|---|---|---|
| DE | 102018127875 A1 | 6/2019 | |
| JP | H11105777 A | 4/1999 | |
| JP | 2005006469 A | 1/2005 | |
| JP | 2008164290 A | 7/2008 | |
| JP | 2013126788 A | 6/2013 | |
| WO | WO-2007072797 A1 * | 6/2007 | ............ B60K 6/365 |
| WO | 2013140546 A1 | 9/2013 | |

* cited by examiner

CONTROL DEVICE OF HYBRID VEHICLE, HYBRID VEHICLE, AND CONTROL METHOD

CROSS-REFERENCE TO RELATED APPLICATION

This application claims priority to and the benefit of Japanese Patent Application No. 2020-213173 filed on Dec. 23, 2020 with the Japan Patent Office, the entire disclosure of which is incorporated herein by reference.

BACKGROUND OF THE INVENTION

Field of the Invention

The present disclosure relates to a control device of a hybrid vehicle, a hybrid vehicle, and a control method.

Description of the Related Art

A hybrid vehicle including a driving power source including an engine and an electric motor is known (see Japanese Laid-Open Patent Application Publication No. 2005-006469, for example). Operation efficiency of the hybrid vehicle is maintained satisfactory by changing torque distribution between the engine and the electric motor.

However, a rider of the hybrid vehicle does not always prioritize the operation efficiency. Depending on situations, the rider may prioritize accelerating performance.

SUMMARY OF THE INVENTION

A control device of a hybrid vehicle according to one aspect of the present disclosure is a control device of a hybrid vehicle, the hybrid vehicle including a driving power source, the driving power source including an engine and an electric motor. The control device includes: a determiner that determines whether or not a predetermined first condition that efficiency is prioritized is satisfied and whether or not a predetermined second condition that output performance is prioritized as compared to the first condition is satisfied; and a control unit that controls the engine and the electric motor in accordance with an accelerator manipulation amount and a determination result of the determiner. Even when the accelerator manipulation amount is the same, and when the first condition is satisfied, the control unit controls the driving power source such that the driving power source outputs first driving force in a first driving state where the efficiency is prioritized, and when the second condition is satisfied, the control unit controls the driving power source such that the driving power source outputs second driving force larger than the first driving force in a second driving state where the output performance is prioritized.

A hybrid vehicle according to another aspect of the present disclosure includes: the driving power source including the engine and the electric motor; an accelerator manipulation element; and the control device that controls the engine and the electric motor in accordance with an accelerator manipulation amount of the accelerator manipulation element.

A method of controlling a hybrid vehicle according to yet another aspect of the present disclosure is a method of controlling a hybrid vehicle including a driving power source, the driving power source including an engine and an electric motor. The method includes: determining whether or not a predetermined first condition that efficiency is prioritized is satisfied and whether or not a predetermined second condition that output performance is prioritized as compared to the first condition is satisfied; and controlling the engine and the electric motor in accordance with an accelerator manipulation amount and a determination result of the determining step. In the controlling step, even when the accelerator manipulation amount is the same, and when the first condition is satisfied, the driving power source is controlled so as to output first driving force in a first driving state where the efficiency is prioritized, and when the second condition is satisfied, the driving power source is controlled so as to output second driving force larger than the first driving force in a second driving state where the output performance is prioritized.

According to the above, when the first condition that the efficiency is prioritized is satisfied, the driving power source is controlled to become the first driving state where the efficiency becomes satisfactory. When the second condition that the output is prioritized is satisfied, the driving power source is controlled to become the second driving state where the output performance becomes more satisfactory than the efficiency, and the output of the driving power source increases. Therefore, performance corresponding to situations is easily obtained in the hybrid vehicle.

DESCRIPTION OF THE PREFERRED EMBODIMENTS

Hereinafter, an embodiment will be described with reference to the drawings. Directions used in the following description are based on directions from the viewpoint of a rider who rides a motorcycle 1. To be specific, a vehicle longitudinal direction corresponds to a front-rear direction, and a vehicle width direction corresponds to a left-right direction.

Figure 1:
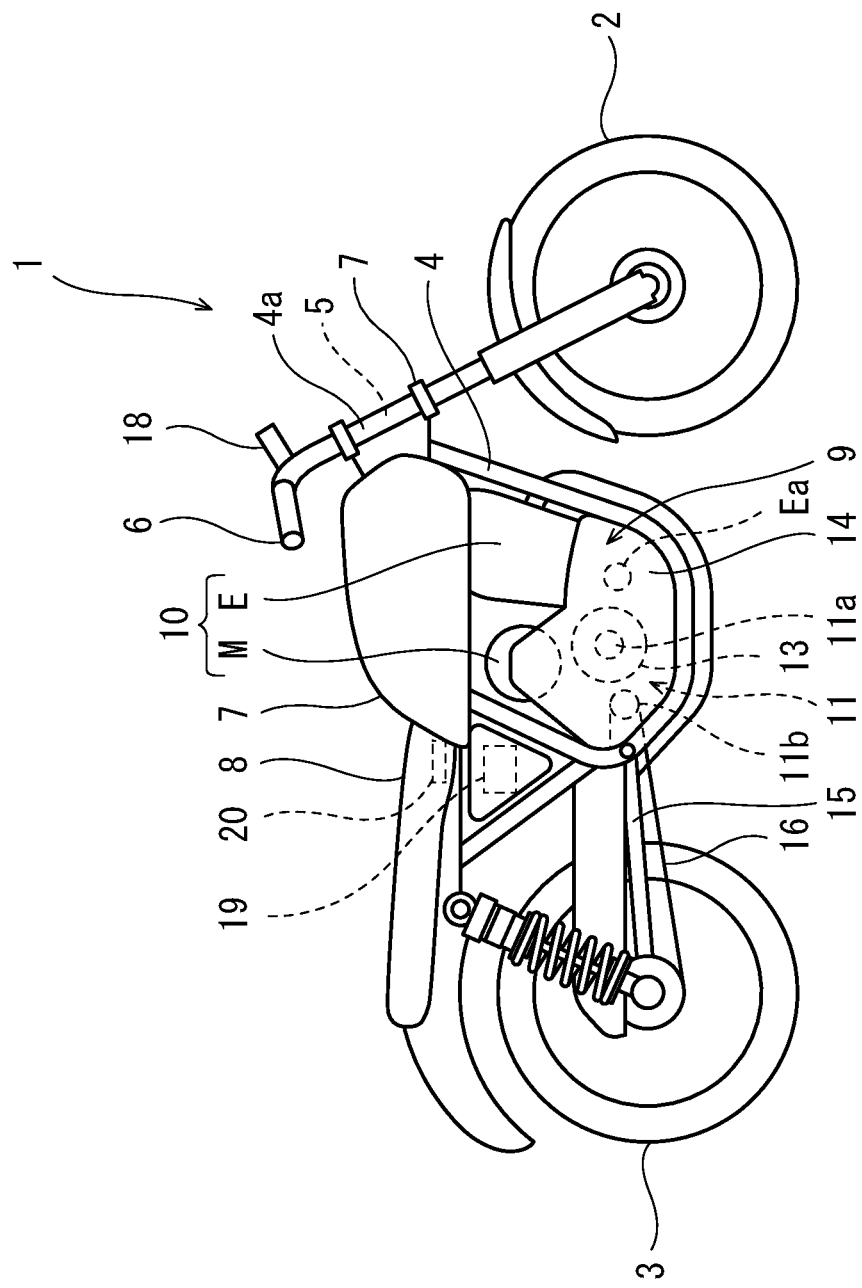
FIG. 1 is a side view of a motorcycle according to an embodiment.

FIG. 1 is a side view of the motorcycle 1 according to the embodiment. As shown in FIG. 1, the motorcycle 1 is one example of a straddle vehicle straddled by a rider and is a hybrid vehicle. The hybrid vehicle is not limited to a motorcycle and may be, for example, an automatic three-wheeled vehicle or an automatic four-wheeled vehicle. The motorcycle 1 includes a front wheel 2 (driven wheel), a rear wheel 3 (driving wheel), and a vehicle body frame 4. The vehicle body frame 4 includes a head pipe 4a and a main frame 4b extending rearward from the head pipe 4a.

A steering shaft 5 is rotatably inserted into the head pipe 4a. A bar-shaped handle 6 held by the rider with both hands is disposed at the steering shaft 5. A meter device 18 is disposed in the vicinity of the handle 6. A fuel tank 7 that stores fuel supplied to an engine E is disposed behind the handle 6. A seat 8 on which the rider is seated is disposed behind the fuel tank 7. A power unit 9 is mounted on the vehicle body frame 4 so as to be located between the front wheel 2 and the rear wheel 3.

As a driving power source 10, the power unit 9 includes the engine E (internal combustion engine) and an electric motor M. The motorcycle 1 includes: a battery 19 that stores electric power supplied to the electric motor M; and a controller 20 (control device) that controls the electric motor M. The electric motor M can be driven by electric power discharged from the battery 19, to generate driving force. In addition, the electric motor M can generate electric power by receiving driving force from outside, to charge the battery 19. An inverter I (see FIG. 4) is incorporated in the electric motor M. However, the inverter I may be disposed outside the electric motor M.

A transmission 11 is disposed behind the engine E. The transmission 11 changes the speed of power output from the engine E and/or the electric motor M. The power output from the transmission 11 is transmitted to the rear wheel 3 through an output transmitting structure 16 (such as a chain or a belt). A swing arm 15 that supports the rear wheel 3 and extends in the front-rear direction is supported by the vehicle body frame 4 so as to be angularly displaceable.

Figure 2:
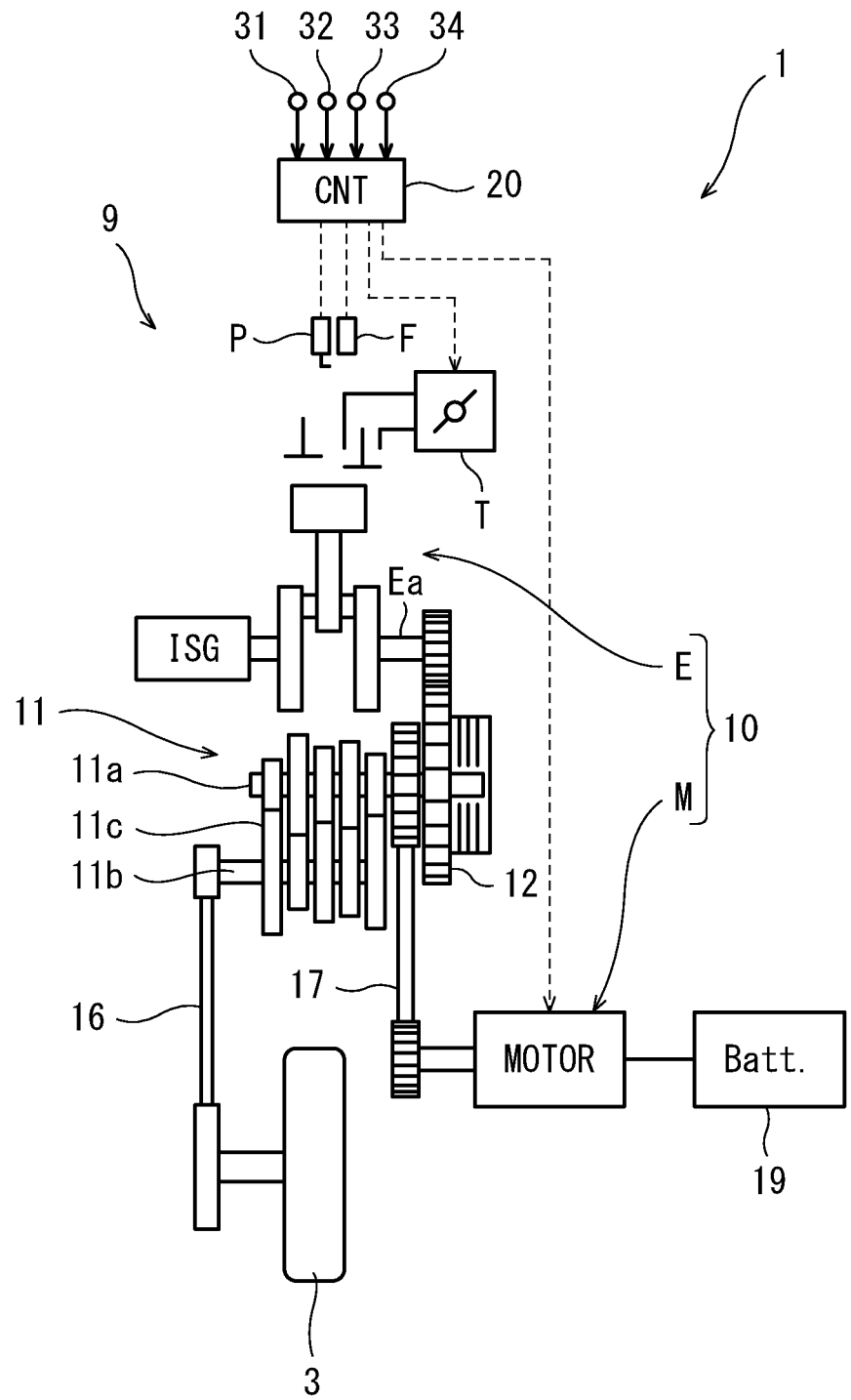
FIG. 2 is a schematic diagram of a power system of the motorcycle of FIG. 1.

FIG. 2 is a schematic diagram of a power system of the motorcycle 1 of FIG. 1. As shown in FIG. 2, a throttle device T, a fuel injector F, and an ignition plug P are disposed at the engine E. The throttle device T includes: a valve that adjusts an intake amount of the engine E; and a throttle motor that drives the valve to adjust a throttle opening degree. The fuel injector F injects the fuel, stored in the fuel tank 7, to an intake passage of the engine E. The ignition plug P ignites a fuel-air mixture of a combustion chamber of the engine E.

The transmission 11 includes an input shaft 11$a$, an output shaft 11$b$, and gear trains 11$c$ having respective reduction ratios different from each other. In the transmission 11, power is transmitted from the input shaft 11$a$ through the gear train 11$c$ to the output shaft 11$b$. Any one of the gear trains 11$c$ is selected, and with this, the speed of the transmitted power is changed. One end portion of a crank shaft Ea of the engine E is connected to a primary gear 12 so as to be able to transmit power to the primary gear 12. The other end portion of the crank shaft Ea is connected to an integrated starter generator ISG so as to be able to transmit power to the integrated starter generator ISG.

The crank shaft Ea is connected to a main clutch 13 through the primary gear 12 so as to be able to transmit power to the main clutch 13. The main clutch 13 is connected to the input shaft 11$a$. To be specific, the crank shaft Ea transmits power to the input shaft 11$a$ through the primary gear 12 and the main clutch 13. The crank shaft Ea, the transmission 11, the primary gear 12, the main clutch 13, and the like are accommodated in a crank case 14 (see FIG. 1).

A driving shaft of the electric motor M is connected to the input shaft 11$a$ through a motor power transmission mechanism 17 so as to be able to transmit power to the input shaft 11$a$. The motor power transmission mechanism 17 may be, for example, a chain-sprocket mechanism, a gear mechanism, or a belt-pulley mechanism.

The engine E and the electric motor M are connected to the input shaft 11$a$ of the transmission 11 in parallel. The rear wheel 3 is driven by the driving force of the engine E and/or the driving force of the electric motor M. To be specific, the motorcycle 1 is a parallel hybrid type hybrid vehicle.

Figure 3:
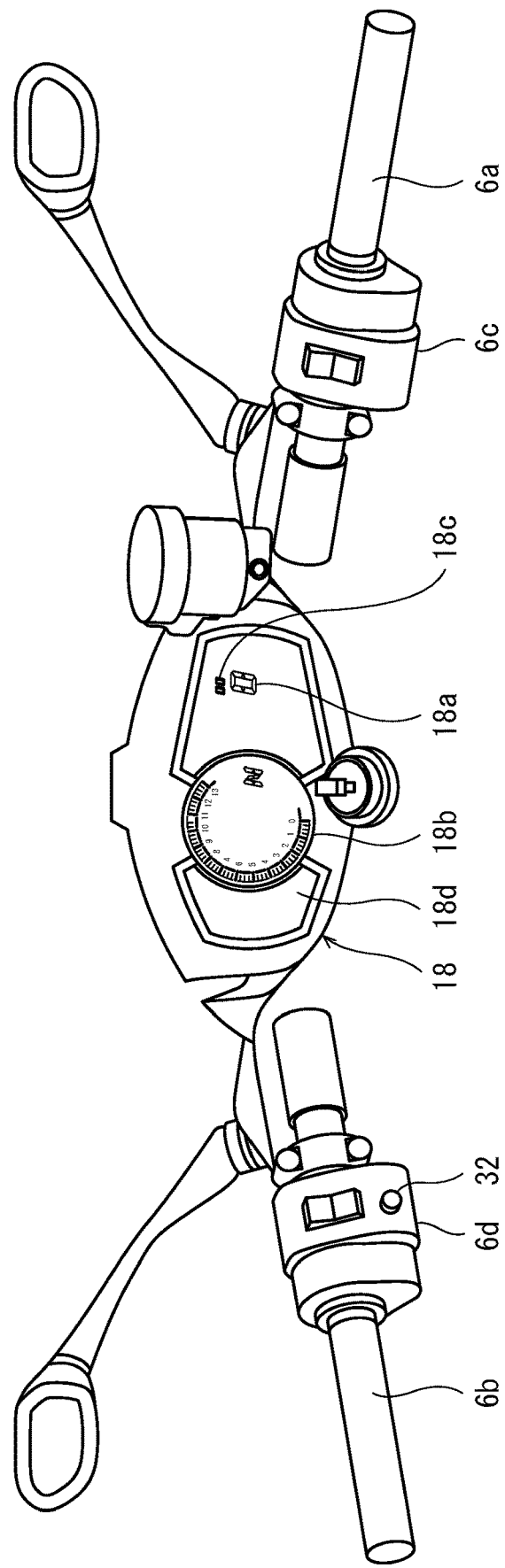
FIG. 3 is a diagram showing a handle and a meter device of the motorcycle of FIG. 1 when viewed from a rider.

FIG. 3 is a diagram showing the handle 6 and the meter device 18 of the motorcycle 1 of FIG. 1 when viewed from the rider. The handle 6 is a bar handle. The handle 6 includes: a right grip 6$a$ (accelerator manipulation element) held by the rider with his/her right hand; and a left grip 6$b$ held by the rider with his/her left hand. The right grip 6$a$ is a member used to perform accelerator manipulation and is turnable by twisting of a wrist of the rider. The handle 6 includes: a right base portion 6$c$ located at a left-right direction middle side of the right grip 6$a$; and a left base portion 6$d$ located at a left-right direction middle side of the left grip 6$b$.

A boost selector 32 to which the rider can input boost selection information is disposed at the left base portion 6$d$. The boost selector 32 is disposed in the vicinity of the handle 6 and separately from the right grip 6$a$ (accelerator manipulation element). The boost selector 32 is activated during traveling only. The boost selector 32 is operatable between a non-manipulating position and a manipulating position and is biased toward the non-manipulating position. For example, the boost selector 32 is a push button switch, is operatable between a push-up position and a push-down position, and is biased by a spring toward the push-up position. Instead of the push button switch, the boost selector 32 may be a lever switch, a touch panel, or the like.

The meter device 18 is arranged between the right grip 6$a$ and the left grip 6$b$ in the left-right direction. The meter device 18 includes a speed meter 18$a$, a rotational frequency meter 18$b$, a travel distance meter 18$c$, a display 18$d$, and the like. An input device (not shown; for example, an input button or a touch panel) is disposed at the meter device 18. The boost selector 32 may be disposed at the meter device 18, the right base portion 6$c$, or any position in the vicinity of the handle 6.

Figure 4:
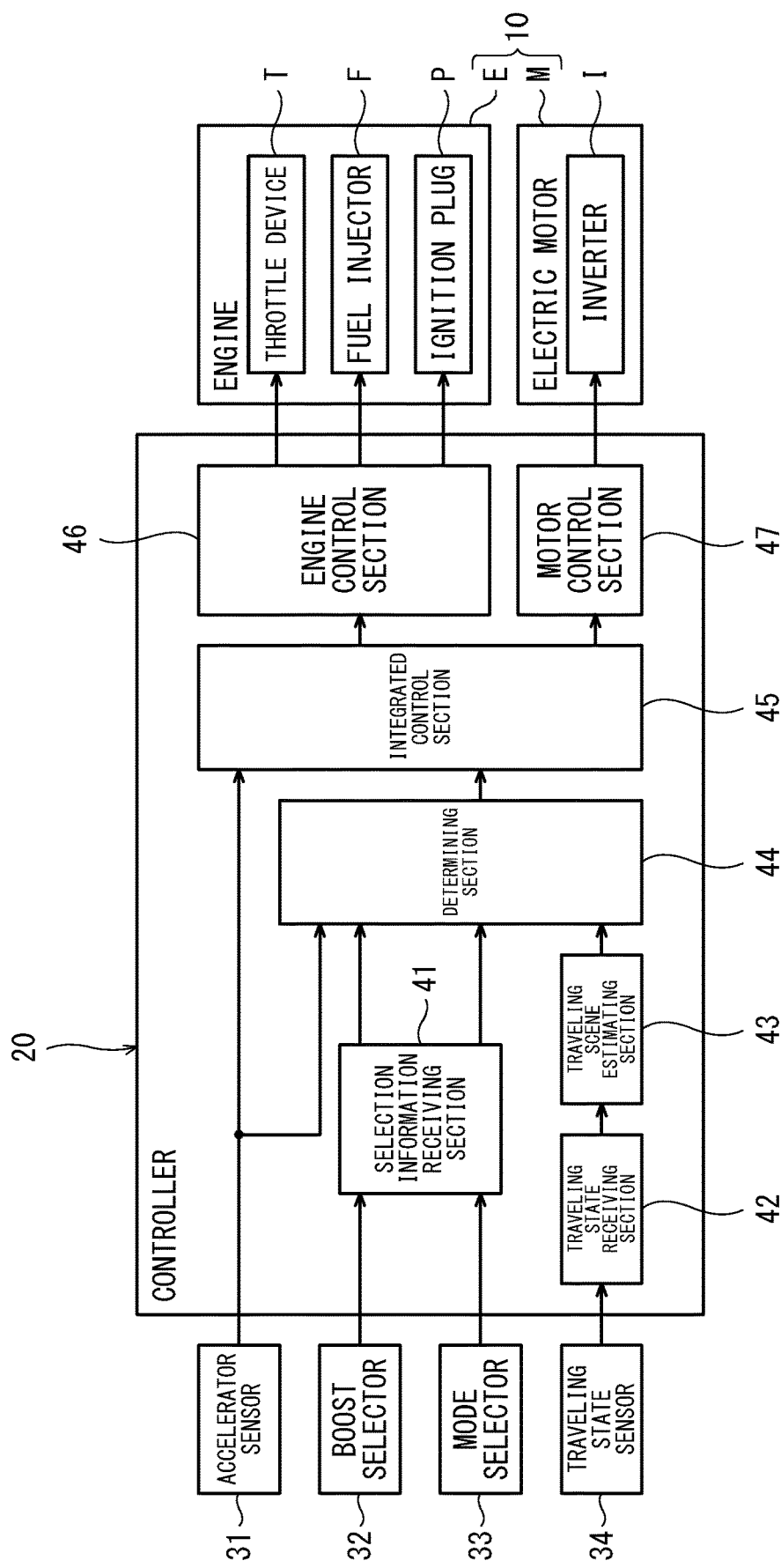
FIG. 4 is a block diagram of a control system of the motorcycle of FIG. 1.

FIG. 4 is a block diagram of a control system of the motorcycle 1 of FIG. 1. As shown in FIG. 4, an accelerator sensor 31, the boost selector 32, a mode selector 33, and a traveling state sensor 34 are electrically connected to an input side of the controller 20. The engine E and the inverter I (of the electric motor M) are electrically connected to an output side of the controller 20.

The accelerator sensor 31 detects an accelerator manipulation amount (accelerator opening degree) of the right grip 6$a$. The boost selector 32 is described above. The mode selector 33 may be a mode selector to which the rider can input selection information. The mode selector 33 may be disposed at the motorcycle 1 and is, for example, a lever switch, a touch panel, a sound collecting microphone, or a control command. The mode selector 33 may be a mobile information terminal (for example, a smartphone) that can communicate with the motorcycle 1.

The mode selector 33 may be activated during a stop state. During traveling, the mode selector 33 may be activated or deactivated. The mode selector 33 may operate in association with start-up of mode control (for example, a traction control mode) implemented in the motorcycle 1. The traveling state sensor 34 detects the traveling state of the motorcycle 1. The traveling state sensor 34 is, for example, a satellite positioning sensor, a gyro sensor, or a vehicle speed sensor. At least one of the boost selector 32, the mode selector 33, and the traveling state sensor 34 may be included. The boost selector 32, the mode selector 33, and the traveling state sensor 34 may be partially omitted.

The controller 20 includes a processor, a memory, an I/O interface, and the like in terms of hardware. The memory includes a storage (for example, a hard disk and a flash memory) and a main memory (RAM). The controller 20 includes a selection information receiving section 41, a traveling state receiving section 42, a traveling scene estimating section 43, a determining section 44, an integrated control section 45, an engine control section 46, and a motor control section 47 in terms of function. The selection information receiving section 41 and the traveling state receiving section 42 are realized by the I/O interface. Each of the selection information receiving section 41, the traveling state receiving section 42, the traveling scene estimating section 43, and the determining section 44 is realized in such a manner that the processor performs calculation processing of a program read by the main memory from the storage.

The engine control section 46 controls the throttle device T, the fuel injector F, and the ignition plug P to control the engine E. The motor control section 47 controls the inverter I to control the electric motor M. In accordance with the accelerator manipulation amount detected by the accelerator sensor 31, the integrated control section 45 determines required torque that is a target value of torque generated at the input shaft 11a by the power from the driving power source 10.

The selection information receiving section 41 receives the selection information from the boost selector 32 and the mode selector 33. The traveling state receiving section 42 receives a signal indicating a traveling state (for example, a traveling position, a vehicle speed, or vehicle acceleration) from the traveling state sensor 34. The traveling scene estimating section 43 estimates a traveling scene (for example, a road surface gradient, a road shape, or an expressway) of the motorcycle 1 based on the traveling state.

Based on the signals from the accelerator sensor 31, the selection information receiving section 41, and the traveling scene estimating section 43, the determining section 44 determines whether or not an efficiency prioritized condition (first condition) that efficiency is prioritized (a ratio of a work amount to energy consumption is made higher than that of an output prioritized condition) is satisfied and whether or not the output prioritized condition (second condition) that output performance is prioritized as compared to the efficiency prioritized condition (output is made larger than that of the efficiency prioritized condition) is satisfied. In accordance with the condition determined in the determining section 44, the integrated control section 45 determines the distribution of the required torque with respect to the engine E and the electric motor M. The integrated control section 45 commands target torques corresponding to the determined torque distribution to the engine control section 46 and the motor control section 47.

Even when the accelerator manipulation amount is the same, the integrated control section 45 changes a driving state of the driving power source 10 between when the efficiency prioritized condition is satisfied and when the output prioritized condition is satisfied, and with this, changes driving force output from the driving power source 10. In a case where the efficiency prioritized condition is satisfied when the accelerator manipulation amount is a predetermined value, the integrated control section 45 controls the driving power source 10 such that the driving power source 10 outputs first driving force in a first driving state where the efficiency is prioritized (efficiency prioritized traveling). In a case where the output prioritized condition is satisfied when the accelerator manipulation amount is the predetermined value, the integrated control section 45 controls the driving power source 10 such that the driving power source 10 outputs second driving force larger than the first driving force in a second driving state where the output performance is prioritized (output prioritized traveling).

The efficiency prioritized condition includes, for example, a condition that an increasing rate of the accelerator manipulation amount detected by the accelerator sensor 31 is less than a threshold. The output prioritized condition includes, for example, a condition that the increasing rate of the accelerator manipulation amount detected by the accelerator sensor 31 is the threshold or more.

The efficiency prioritized condition includes a condition that the selection information receiving section 41 has received first selection information indicating that the boost selector 32 is at the non-manipulating position. The output prioritized condition includes a condition that the selection information receiving section 41 has received second selection information indicating that the boost selector 32 is at the manipulating position.

The efficiency prioritized condition includes a condition that the selection information receiving section 41 has received the first selection information from the mode selector 33. The output prioritized condition includes a condition that the selection information receiving section 41 has received the second selection information from the mode selector 33. The first selection information may be information indicating that nothing is input to the mode selector 33.

The efficiency prioritized condition includes a condition that the traveling scene estimated by the traveling scene estimating section 43 is a first traveling scene (for example, a flat road, a downhill road, or a general road). The output prioritized condition includes a condition that the traveling scene estimated by the traveling scene estimating section 43 is a second traveling scene (for example, an uphill road, an expressway, or a winding road) different from the first traveling scene.

Figure 5:
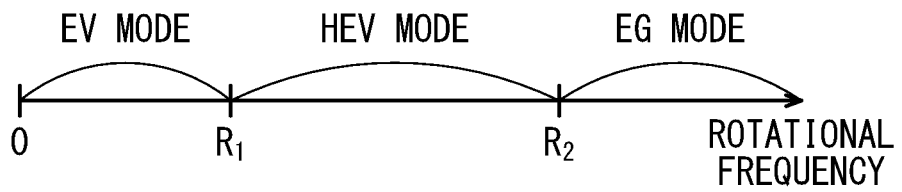
FIG. 5 is a diagram for explaining a torque distribution mode of the motorcycle of FIG. 1.

FIG. 5 is a diagram for explaining a torque distribution mode of the motorcycle 1 of FIG. 1. As shown in FIG. 5, the integrated control section 45 of the controller 20 determines the torque distribution mode in accordance with the rotational frequency of the engine E and/or the rotational frequency of the electric motor M. The engine E is efficient at an intermediate rotational frequency and a high rotational frequency, and the electric motor M is efficient at a low rotational frequency and an intermediate rotational frequency. For example, the integrated control section 45 sets an EV mode at the start of the traveling. As the rotational frequency of the input shaft 11a increases, the integrated control section 45 changes the mode in order of the EV mode, an HEV mode, and an EG mode. To be specific, the EV mode is set in a period from when the electric motor M is started up until when the rotational frequency of the electric motor M reaches a value $R_1$. The HEV mode is set until the rotational frequency of the electric motor M reaches a value $R_2$. The EG mode is set when the rotational frequency of the electric motor M exceeds the value $R_2$. A horizontal axis of FIG. 5 may denote the rotational frequency of the engine E when the engine E is driving. A horizontal axis of FIG. 5 may denote the rotational frequency of the input shaft 11a.

The EV mode is a mode in which: 100% of the required torque is distributed to the electric motor M; and the traveling is performed by driving the electric motor M without driving the engine E. The HEV mode is a mode in which: the required torque is distributed to the engine E and the electric motor M; and the traveling is performed by driving both the engine E and the electric motor M. The EG mode is a mode in which: 100% of the required torque is distributed to the engine E; and the traveling is performed by driving the engine E without driving the electric motor M.

The torque distribution between the engine E and the electric motor M in the second driving state when the output prioritized condition is satisfied is different from the torque distribution between the engine E and the electric motor M in the first driving state when the efficiency prioritized condition is satisfied. For example, the first driving state is a state where only one of the engine E and the electric motor M is driving, and the second driving state is a state where both the engine E and the electric motor M are driving. The first driving state may be a state where: the engine E is driving; but a power transmission path from the engine E to the input shaft 11a is cut. When the first driving state is changed to the second driving state, the above cut power transmission path may be connected.

Figure 6:
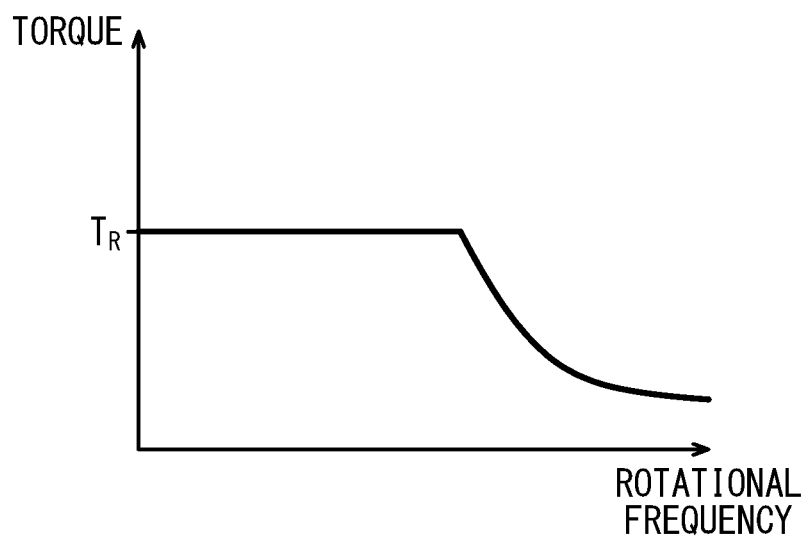
FIG. 6 is a graph for explaining a torque characteristic of an electric motor of FIG. 1.

FIG. 6 is a graph for explaining a torque characteristic of the electric motor M of FIG. 1. As shown in FIG. 6, rated torque $T_R$ of the electric motor M is constant at less than a predetermined rotational frequency and gradually decreases at the predetermined rotational frequency or more. The rated torque $T_R$ is torque generated when the electric motor M continuously outputs rated output at a rated voltage and a rated frequency. The first driving state when the efficiency prioritized condition is satisfied is a state where the electric motor M outputs torque that is the rated torque $T_R$ or less.

To be specific, in first driving state, the rated torque $T_R$ is set to a torque upper limit of the electric motor M. The second driving state when the output prioritized condition is satisfied is a state where the electric motor M outputs torque that exceeds the rated torque $T_R$. To be specific, in the second driving state, the torque upper limit of the electric motor M may become higher than the rated torque $T_R$, and the electric motor M may generate torque higher than the rated torque $T_R$.

Next, the following will individually describe first output prioritized traveling in which the output prioritized condition is satisfied only in a short period of time and second output prioritized traveling in which the output prioritized condition is satisfied without a time limit.

The first output prioritized traveling is executed in accordance with the signals from the accelerator sensor 31 and the boost selector 32. When the increasing rate of the accelerator manipulation amount detected by the accelerator sensor 31 becomes the threshold or more since the rider suddenly manipulates the right grip 6a to an acceleration side, the determining section 44 satisfies the output prioritized condition. When the selection information receiving section 41 receives information indicating that the rider has set the boost selector 32 to the manipulating position, the determining section 44 satisfies the output prioritized condition. A condition that: the increasing rate of the accelerator manipulation amount is less than the threshold; and the boost selector 32 is at the non-manipulating position is a first output prioritized condition.

When the first output prioritized condition is satisfied, the integrated control section 45 executes the first output prioritized traveling in which: the state of the driving power source 10 is forcibly changed from the first driving state to the second driving state regardless of the rotational frequency of the electric motor M; and the driving force output from the driving power source 10 is temporarily increased. To be specific, originally (when the first output prioritized condition is not satisfied), the driving force input from the driving power source 10 to the transmission 11 is the first driving force. However, even when the accelerator manipulation amount is the same, and when the first output prioritized condition is satisfied, the driving force input from the driving power source 10 to the transmission 11 is increased to a value (second driving force) larger than the first driving force.

In the first output prioritized traveling, even when the rotational frequency of the electric motor M is less than the value $R_1$ (see FIG. 5), the EV mode may be forcibly changed to the HEV mode, and the driving force input from the driving power source 10 to the transmission 11 may be increased by the addition of the driving force of the engine E. In the first output prioritized traveling, even when the rotational frequency of the engine E is the value $R_2$ or more (see FIG. 5), the EG mode may be forcibly changed to the HEV mode, and the driving force input from the driving power source 10 to the transmission 11 may be increased by the addition of the driving force of the electric motor M. In the first output prioritized traveling, regardless of the rotational frequency of the electric motor M and the rotational frequency of the engine E, the electric motor M may be made to generate torque that exceeds the rated torque $T_R$.

The integrated control section 45 includes a timer that limits a duration time of the first output prioritized traveling (second driving state) such that the duration time becomes less than a predetermined time limit (for example, five to ten seconds). With this, the first output prioritized traveling terminates in a short period of time and returns to the efficiency prioritized traveling. Moreover, the first output prioritized traveling may be continued while the information indicating that the boost selector 32 is at the manipulating position is continuously detected. The boost selector 32 automatically returns to the non-manipulating position as long as the rider does not continuously manipulate the boost selector 32. Therefore, a state where the boost selector 32 is at the manipulating position does not continue for a long period of time. On this account, according to the first output prioritized traveling, while instantaneously enhancing the accelerating performance, the electric motor M is prevented from excessively generating heat.

The second output prioritized traveling is executed in accordance with the signals from the mode selector 33 and the traveling scene estimating section 43. When the selection information receiving section 41 receives the second selection information input to the mode selector 33 by manipulation or voice of the rider, the determining section 44 satisfies the output prioritized condition. When the traveling scene estimating section 43 estimates that the traveling scene is the second traveling scene, the determining section 44 satisfies the output prioritized condition. A condition that: the selection information receiving section 41 has received the second selection information; and the traveling scene estimating section 43 has estimated that the traveling scene is the second traveling scene is a second output prioritized condition.

When the second output prioritized condition is satisfied, the integrated control section 45 executes the second output prioritized traveling in which: the state of the driving power source 10 is forcibly changed from the first driving state to the second driving state regardless of the rotational frequency of the electric motor M; and the driving force output from the driving power source 10 is increased. The second output prioritized traveling is continued until the selection information receiving section 41 receives the first selection information or until the traveling scene estimating section 43 estimates that the traveling scene is the first traveling scene.

In the second output prioritized traveling, even when the rotational frequency of the electric motor M is less than the value $R_1$ (see FIG. 5), the EV mode may be forcibly changed to the HEV mode, and the driving force input from the driving power source 10 to the transmission 11 may be increased by the addition of the driving force of the engine E. In the second output prioritized traveling, even when the rotational frequency of the engine E is the value $R_2$ or more (see FIG. 5), the EG mode may be forcibly changed to the HEV mode, and the driving force input from the driving power source 10 to the transmission 11 may be increased by the addition of the driving force of the electric motor M.

According to the above-described configuration, when the first condition that the efficiency is prioritized is satisfied, the driving power source is controlled to become the first driving state where the efficiency becomes satisfactory. When the second condition that the output is prioritized is satisfied, the driving power source is controlled to become the second driving state where the output performance becomes more satisfactory than the efficiency, and the output of the driving power source increases. Therefore, performance corresponding to situations is easily obtained in the hybrid vehicle.

Moreover, the torque distribution between the engine and the electric motor is different between the first driving state and the second driving state. With this, when the second condition is satisfied, the driving force of the driving power source is easily increased. Thus, the output performance can be suitably improved in accordance with situations.

Moreover, the second driving state is a state where the electric motor outputs torque that exceeds the rated torque. With this, in the second driving state, the accelerating performance can be instantaneously increased while suppressing the generation of the exhaust gas. To be specific, according to the hybrid vehicle, a time in which the output performance is prioritized is shorter than a time in which the efficiency is prioritized. Therefore, when the second condition is satisfied, the electric motor is made to specially output torque that exceeds the rated torque, and with this, quick acceleration can be realized.

Moreover, when the first driving state is changed to the second driving state, the engine that is in a stop state in the first driving state is driven. With this, the deterioration of the efficiency of the electric motor that has been driving in the first driving state can be suppressed.

Moreover, the second condition includes a condition that the increasing rate of the accelerator manipulation amount is higher than that in the first condition. With this, control which properly reflects an acceleration request of the rider can be realized without special manipulation of the rider.

Moreover, whether the first condition is satisfied or the second condition is satisfied is determined based on the type of the selection information input to the selector by the rider. Therefore, the traveling that prioritizes the efficiency and the traveling that prioritizes the output performance can be switched in accordance with the request of the rider.

Moreover, the selector is biased toward the non-manipulating position. To continue the traveling that prioritizes the output performance, the rider has to continuously manipulate the selector. Therefore, the traveling that prioritizes the output performance can be prevented from continuing for a long period of time. On this account, excessive heat generation of the motor can be suppressed.

Moreover, whether the first condition is satisfied or the second condition is satisfied is determined by the traveling scene estimated based on the signal indicating the traveling state received from the traveling state sensor. Therefore, the traveling that prioritizes the efficiency and the traveling that prioritizes the output performance can be automatically switched in accordance with the traveling scene.

The present disclosure is not limited to the above-described embodiment, and modifications, additions, and eliminations may be made with respect to the configuration of the embodiment. For example, whether information input to the mode selector 33 is the first selection information or the second selection information may be determined by, for example, machine learning of AI. Moreover, the output prioritized condition may include a condition that a remaining amount of a battery that supplies electric power to the electric motor M is a predetermined amount or more. With this, the remaining amount of the battery is prevented from decreasing beyond necessity by temporary driving of the electric motor M. Moreover, in the output prioritized traveling, while increasing the entire driving force of the driving power source 10, a regenerative state of the electric motor M may be realized by the driving force of the engine E. Furthermore, the transmission 11 may be an automatic transmission, and in the output prioritized traveling, the driving force of the rear wheel 3 may be increased by automatic speed change.

The program may be stored in a computer-readable medium. The computer-readable medium is a non-transitory, tangible medium. The computer-readable medium may be a storage medium that is incorporated in or externally attached to a computer (such as a mobile information terminal, a personal computer, or a server). The storage medium may be a RAM, a ROM, an EEPROM, and/or a storage. The storage medium may be, for example, a hard disk, a flash memory, and/or an optical disk. The program stored in the storage medium may be executed in a computer to which the storage medium is directly connected or may be executed in a computer to which the storage medium is connected through a network (for example, the Internet).

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:
1. A hybrid vehicle, comprising:
 a driving power source including an internal combustion engine and an electric motor;
 an accelerator manipulation element;
 a selector to which selection information is input and is operable between a non-manipulating position and a manipulating position; and
 a control device that controls the engine and the electric motor in accordance with an accelerator manipulation amount of the accelerator manipulation element, wherein
 the control device includes:
  a determiner that determines whether or not a predetermined first condition is satisfied and whether or not a predetermined second condition is satisfied;
  a control unit that controls the engine and the electric motor in accordance with the accelerator manipulation amount and a determination result of the determiner; and a selection information receiver that receives the selection information from the selector,
even when the accelerator manipulation amount is the same, and
when the first condition is satisfied, the control unit controls the driving power source such that the driving power source outputs first driving force in a first driving state, and
when the second condition is satisfied, the control unit controls the driving power source such that the driving power source outputs second driving force larger than the first driving force in a second driving state,
the first condition includes a condition that the selection information is first selection information that is information indicating that the selector is at the non-manipulating position,
the second condition includes a condition that the selection information is second selection information that is information indicating that the selector is at the manipulating position, and
the control unit controls the driving power source such that the driving power source outputs the second driving force in the second driving state while the selection information receiver continuously receives the second selection information.

2. The hybrid vehicle according to claim 1, wherein torque distribution between the engine and the electric motor in the second driving state is different from torque distribution between the engine and the electric motor in the first driving state.

3. The hybrid vehicle according to claim 1, wherein:
the first driving state is a state where the electric motor outputs torque that is predetermined rated torque or less; and
the second driving state is a state where the electric motor outputs torque that exceeds the rated torque.

4. The hybrid vehicle according to claim 1, wherein:
the first driving state is a state where only one of the engine and the electric motor is driving; and
the second driving state is a state where both the engine and the electric motor are driving.

5. The hybrid vehicle according to claim 1, wherein the second condition includes a condition that an increasing rate of the accelerator manipulation amount is higher than that of the first condition.

6. The hybrid vehicle according to claim 1, wherein:
the selector is biased by a spring toward the non-manipulating position.

7. The hybrid vehicle according to claim 1, further comprising a traveling state sensor that detects a traveling state of the hybrid vehicle, wherein:
the control device includes:
a traveling state information receiver that receives a signal indicating the traveling state from the traveling state sensor; and
a traveling scene estimator that estimates a traveling scene of the hybrid vehicle based on the traveling state;
the first condition includes a condition that the traveling scene estimated by the traveling scene estimator is a first traveling scene; and
the second condition includes a condition that the traveling scene estimated by the traveling scene estimator is a second traveling scene different from the first traveling scene.

8. The hybrid vehicle according to claim 1, further comprising a bar handle including the accelerator manipulation element, wherein the selector is disposed in the vicinity of the bar handle.

9. The hybrid vehicle according to claim 1, wherein
the accelerator manipulation element is located at one side of a left-right direction of the vehicle, and
the selector is located at the one side of the left-right direction of the vehicle.

10. The hybrid vehicle according to claim 1, wherein the selector includes a push button switch, a lever switch, or a touch panel.

11. The hybrid vehicle according to claim 1, wherein the control unit switches from the second driving state to the first driving state based on at least one of a duration time of the second driving state, an increasing rate of the accelerator manipulation amount, and a remaining amount of a battery.

12. A method of controlling a hybrid vehicle including a driving power source, the driving power source including an engine and an electric motor, the method comprising:
receiving, via a selection information receiver, selection information from a selector that is operable between a non-manipulating position and a manipulating position;
determining whether or not a predetermined first condition is satisfied and whether or not a predetermined second condition is satisfied; and
controlling the engine and the electric motor in accordance with an accelerator manipulation amount and a determination result of the determining step, wherein
in the controlling step, even when the accelerator manipulation amount is the same, and
when the first condition is satisfied, the driving power source is controlled so as to output first driving force in a first driving state, and
when the second condition is satisfied, the driving power source is controlled so as to output second driving force larger than the first driving force in a second driving state,
the first condition includes a condition that the selection information is first selection information that is information indicating that the selector is at the non-manipulating position,
the second condition includes a condition that the selection information is second selection information that is information indicating that the selector is at the manipulating position, and
controlling the engine and the electric motor includes controlling the driving power source such that the driving power source outputs the second driving force in the second driving state while the selection information receiver continuously receives the second selection information.

13. A hybrid vehicle, comprising:
a driving power source including an internal combustion engine and an electric motor;
an accelerator manipulation element;
a selector that is operable by a driver; and
a control device that controls the engine and the electric motor in accordance with an accelerator manipulation amount of the accelerator manipulation element, wherein
the control device includes:
a determiner that determines whether or not a predetermined first condition, including a condition that the selector is in a non-manipulating state where the selector is not operated by the driver, is satisfied, and whether or not a predetermined second condition, including a condition that the selector is in a manipulating state where the selector is operated by the driver, is satisfied; and a control unit that controls the engine and the electric motor in accordance with the accelerator manipulation amount and a determination result of the determiner, even when the accelerator manipulation amount is the same, and when the first condition is satisfied, the control unit controls the driving power source such that the driving power source outputs first driving force in a first driving state, and when the second condition is satisfied, the control unit controls the driving power source such that the driving power source outputs second driving force larger than the first driving force in a second driving state, and the control unit switches from the second driving state to the first driving state based on at least one of a duration time of the second driving state, an increasing rate of the accelerator manipulation amount, and a remaining amount of a battery.

14. The hybrid vehicle according to claim 13, further comprising a bar handle including the accelerator manipulation element, wherein the accelerator manipulation element is located at one side of a left-right direction of the vehicle; and the selector is located in the vicinity of the bar handle and at the one side of the left-right direction of the vehicle.

* * * * *